United States Patent [19]

Bergendahl et al.

[11] Patent Number: 4,724,043
[45] Date of Patent: Feb. 9, 1988

[54] PROCESS FOR FORMING A MASTER MOLD FOR OPTICAL STORAGE DISKS

[75] Inventors: Albert S. Bergendahl, Jericho; Paul E. Cade, Colchester, both of Vt.; Norman T. Gonnella, Rochester; Francis S. Luecke, Byron, both of Minn.; Kurt E. Petersen, San Jose, Calif.

[73] Assignee: International Business Machines Corporation, Armonk, N.Y.

[21] Appl. No.: 943,845

[22] Filed: Dec. 24, 1986

Related U.S. Application Data

[63] Continuation of Ser. No. 647,088, Sep. 4, 1984, abandoned.

[51] Int. Cl.⁴ .................. B44C 1/22; C03C 15/00; C03C 25/06
[52] U.S. Cl. .................. 156/643; 156/657; 156/659.1; 204/192.37; 430/321; 430/323
[58] Field of Search ............. 156/633, 643, 646, 657, 156/659.1, 662; 204/192.37; 430/320, 321, 323, 326, 329; 346/76 L

[56] References Cited

U.S. PATENT DOCUMENTS

| | | | |
|---|---|---|---|
| 4,125,427 | 11/1978 | Chen et al. | 156/657 |
| 4,180,432 | 12/1979 | Clark | 156/657 X |
| 4,259,433 | 3/1981 | Mizobuchi et al. | 156/659.1 X |
| 4,350,561 | 9/1982 | Little | 156/662 X |
| 4,512,848 | 4/1985 | Deckman et al. | 204/192 E X |

*Primary Examiner*—William A. Powell
*Attorney, Agent, or Firm*—Homer L. Knearl; Carl W. Laumann, Jr.

[57] ABSTRACT

A method for forming a master mold for optical storage disks includes thermally growing an oxide or nitride layer on a semiconductor wafer. The thermally grown layer is then coated with a photoresist. The photoresist is exposed to a laser beam to form a data pattern and developed. The oxide or nitride under the developed pattern is etched and the photoresist stripped to provide a semiconductor master mold for optical disks.

11 Claims, 8 Drawing Figures

PROCESS FOR FORMING A MASTER MOLD FOR OPTICAL STORAGE DISKS

This is a continuation of co-pending application Ser. No. 647,088 filed on Sept, 4, 1984, now abandoned.

FIELD OF THE INVENTION

This invention relates to a method for producing optical storage disks and more particularly to a process for forming a master mold for optical storage disks.

DESCRIPTION OF THE PRIOR ART

Optical storage disks are widely used in video disk and more recently in digital audio disk (DAD) systems.

In such systems a focused laser beam records information as "data pits" along an information track of an optical data storage disk. Information is read back by sensing the light reflected back by said disk when illuminated by a reading laser beam. The operation relies on the net reflection of light from a series of "data pits", which are usually differentiated from the substrate by an additional quarter wavelength (of the reading monochromatic laser beam) depth. Light reflected from the data pits travels a net half wavelength additional path length as compared to the light reflected from the substrate. This results in destructive (constructive) phase type interference and a net change in the photo detector output signal representing the light reflected by the disk. A half wavelength difference in path length produces maximum contrast between the data pits and the substrate surface. In the case of recorded data, the high contrast is desirable. There are applications which do not require that maximum contrast be obtained: for example, servo tracks which guide the optical read-/write head. For such applications the difference in path length can be less than a half wavelength, say one quarter wavelength, produced by a pit depth of one eighth wavelength. Optical storage disks are commonly manufactured by forming the two separate sides through replication of masters, and bonding the sides together. The information carrying surface may be on the interior, in which case the two sides may be separated by an air gap if the disk is to have additional information recorded thereon after the disk is fabricated.

Alternatively, the information carrying surface may be on the exterior. In such embodiments, the disks are coated with a transparent material to protect the information. Metal may be deposited on the information carrying surface of each half to improve reflectivity. The data is read through the clear substrate via an objective lens.

Existing techniques for fabricating a master mold are complex and difficult to control. This leads to excessive scrap and causes deterioration in the signal to noise ratio.

In one process, a master substrate, e.g. glass, is ground and polished to an optically flat surface. Next a positive photoresist is applied and cured on the glass substrate. The photoresist is then exposed to a laser beam modulated according to the data. The photoresist is developed and an etch of the glass is accomplished in the exposed areas. The resist is then stripped and the data pit depth checked. If the depth is correct the second subprocess begins.

A metal submaster or replica is formed in the second half of the process. The glass is cleaned and a thin layer of metal is deposited either by sputtering, thermal evaporation, aqueous chemical deposition or other equivalent technique. This metal layer provides a base for a further plating until a reasonable thickness is obtained. The replica is then peeled from the glass and affixed in the molding fixture.

In a somewhat simpler process, a glass substrate is ground and polished to an optically flat surface and a chrome or other satisfactory metal layer of 50 Å is then deposited on the glass substrate. A photoresist is applied to provide a fractional wavelength thickness layer, exposed to a laser beam modulated according to the data and developed. The resist-chrome-glass assembly now serves as a master for further process steps. This process is dependent on mechanical spinning and thinning of the photoresist to provide uniform fractional wavelength thickness. Further, the profiles of the pits must be gradual to prevent tearing of the photoresist and chrome from the glass substrate when the plated replica is peeled as described above.

U.S. Pat. No. 4,259,433 describes a method for producing a master in which an "etching layer" is first formed on a glass substrate. Then a laser sensitive layer is formed on the etching layer. The laser sensitive layer is then exposed to a laser beam. The portions of the etching layer which correspond to the exposed portions of laser sensitive layer are then removed by sputter etching. A submaster or replica may then be obtained by known methods such as plating.

One drawback of this method still remains the number of steps necessary to obtain the submaster or replica and the time required to obtain a surface finish compatible with the required precision. This adds to the cost to the point where any advantage over the previous methods is lost.

SUMMARY OF THE INVENTION

The principal object of the invention is to provide a process for forming a master mold for optical storage disks wherein a superior surface finish is obtained.

Another object of the invention is to provide a process for forming a master mold for optical storage disks with a minimum of steps.

A further object of the invention is to provide a process for forming a master mold for optical storage disks including a precise control of the data pit depth.

These objects are accomplished by using a silicon wafer coated with a thermally grown or thermally chemical-vapor deposited oxide as a substrate which will further be coated with a photoresist, exposed to a laser beam and developed. The oxide is then etched using a conventional method and the photoresist stripped to provide a silicon master mold insert which carries the desired data pattern in the oxide layer. The data pattern may be representative of information which is to be later retrieved or simply a track servo pattern designed to facilitate recording on molded replicas.

DETAILED DESCRIPTION OF THE INVENTION

Figure 1:
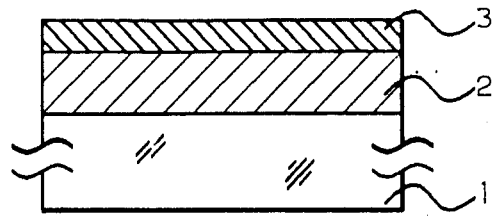
FIGS. 1 to 3 are sectional views showing the process for manufacturing a disk master according to the prior art.
Figure 2:
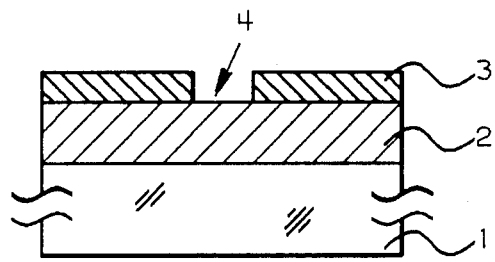
Figure 3:
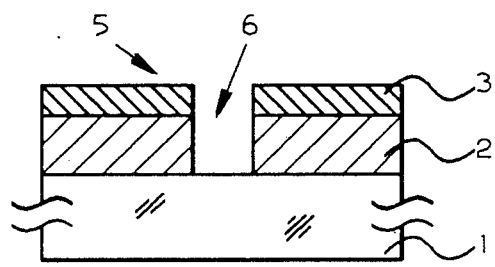

FIGS. 1 to 3 show the successive steps of a prior art process for manufacturing a disk master.

Referring to FIG. 1 a substrate 1, made from optically polished glass is covered by an etching layer 2, made of a material which can be easily etched. A laser sensitive layer 3 is formed on etching layer 2. The laser sensitive layer can be a photoresist or a metal or alloy which dissolves or sublimes when struck by a laser beam of sufficient energy. The data is recorded as a pattern of holes in layer 3 which allows the remaining portion of layer 3 to act as a mask for the underlying etching layer.

As shown in FIG. 2, portions 4 of laser sensitive layer 3 are removed by a laser beam modulated according to the data to be recorded. Then using portions 5 not exposed to the laser beam as a mask, portions 6 of the etching layer 2 which were exposed to the laser beam are removed by sputter etching to form pits and provide the disk master as shown in FIG. 3. A metal submaster or replica having a reverse pattern may now be obtained from the disk master by known methods such as plating.

The master mold forming process for optical storage disks according to the invention will now be described with reference to FIGS. 4 to 8.

This approach is mainly based on the use of the mechanical and thermal properties of semiconductor materials which have been largely ignored in light of their electrical properties, for example, the yield strength of silicon is three times that of stainless steel and the surface finish of single crystal silicon wafers is far superior to the tool steel commonly used in making plastic injection or press molds.

The process according to the invention will be described with reference to a silicon substrate and a silicon oxide etchable layer.

Figure 4:
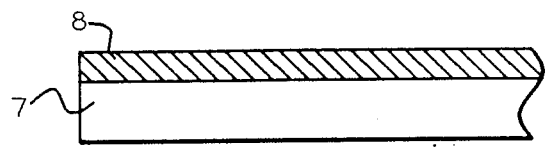
FIGS. 4 to 8 are sectional views showing the process for manufacturing a silicon master mold according to the invention.

Referring first to FIG. 4, a silicon wafer 7 is cleaned and a thermally grown or thermally, chemical-vapor deposited silicon oxide layer 8, having a thickness from 500 to 3000 Å; corresponding to any fraction of a wavelength of the reading laser beam, is formed on said silicon wafer. Conventional semiconductor process techniques as described in: "Integrated Circuit Fabrication Technology" by D. J. Elliot, McGraw-Hill Book Company, 1982, may be used. (Examples of growing an oxide layer are described at pages 9-11 of the Elliott text, and examples of chemical-vapor depositing an oxide or nitride layer are described at pages 21-22 of the Elliott text.) Typically, bipolar base oxides have a thickness of 1000 Å to 1500 Å. The oxide layer is measured to ensure it has the required thickness, i.e., a given fraction of a wavelength of the monochromatic laser beam. If the thermal oxide layer 8 is within specifications, the silicon wafer 7 with the oxide layer 8 may be stored until the beginning of the next process step. If the oxide layer 8 is out of specification it may be stripped and regrown. This avoids waste and permits tighter tolerances to be maintained. If desired, known techniques may be used to measure the oxide layer thickness as it is formed. This will not normally be required once the process has been stabilized. It should be appreciated that the oxide is grown from the silicon so that a monolithic structure is obtained. This process does not rely on any metal adhesion properties.

Figure 5:
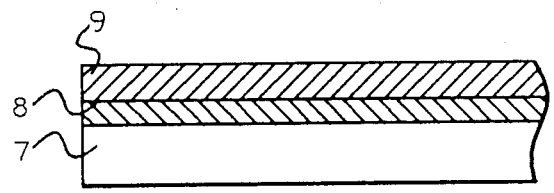
Figure 6:
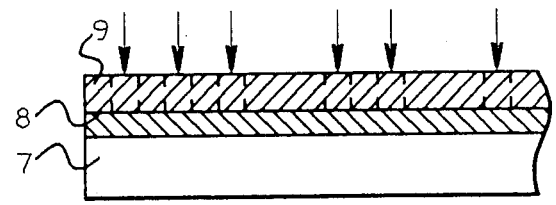
Figure 7:
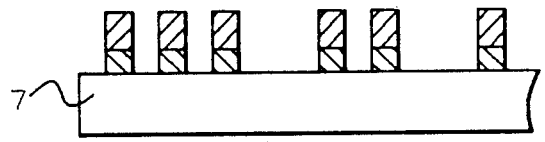

Referring now to FIGS. 5 and 6, a photoresist layer 9 is applied by a known method, e.g., spin coating, on said thermal oxide layer 8. Current state of the art uses a photoresist to achieve the desired features, but concentricity and positioning of data cannot be done by conventional semiconductor photolithography over the area needed on a typical disk. Photoresist layer 9 is exposed to a modulated laser beam according to a method described in an article: "Laser Beam Recording Of Video Master Disks" by B. A. J. Jacobs, published in Applied Optics, Vol. 17, No. 13, July 1, 1978, pages 2001-2006. At the next step, shown in FIG. 7, the exposed photoresist is developed according to a method allowing removal to occur at the portions of the photoresist layer 9 not exposed to the laser beam, as described in U.S. Pat. No. 4,104,070. A positive photoresist is used in conjunction with an image reversal process to achieve the higher resolution provided by positive photoresists. A negative photoresist would simplify the process somewhat but would also result in lower resolution with currently available photoresists.

The unmasked portions of the oxide layer 8 are then etched using a conventional method such as reactive ion etching (RIE), standard aqueous etching or sputter etching. During this step the silicon substrate 7 acts as an automatic etch stop, thereby providing automatically the proper height to the data pits in the master mold insert and the corresponding proper depth in the molded optical storage disk. The sloping sidewalls which are characteristic of aqueous etching make this a preferred technique since it provides the draft which makes it easy to remove the part from the mold.

Figure 8:
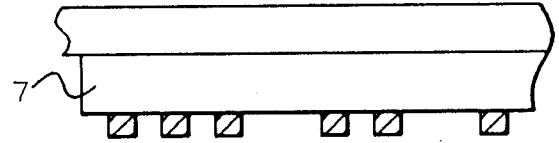

At the next step, the photoresist layer is stripped and the master mold insert completed, as shown in FIG. 8, requiring only that it be inserted into the molding jig.

Although the process hereabove described uses silicon and silicon dioxide, other substrate materials such as germanium and etchable layers such as silicon carbide or silicon nitride can be used. The described process would work on these equally well with only slight modifications.

The process according to the invention provides good quality disks with a minimum of process steps. The surface finish which can be obtained on a silicon wafer is approximately ten times better than that which can be obtained on glass substrates with current technology.

The thermal conductivity and expansion of silicon allow the use of the obtained submaster or replica directly in the mold, thereby eliminating the costs associated with preparing another element for actual use in the mold. Direct use of the submaster also eliminates any flaws which might result during the process of preparing another mold element.

The silicon and silicon oxide wear resistance allow many more disks to be molded as compared to a conventional plated replica, which further reduces the costs associated with the product.

Despite the advantages resulting from direct use of the silicon element in the mold, there may be particular applications where the element is used to form another element, which is then used in the mold.

We claim:

1. A process for forming a master mold for insertion in a molding jig used for making optical storage disks having data pits of a predetermined depth, the steps including:

thermally creating a layer of etchable material on a surface of a single-crystalline semiconductor substrate, said substrate and said etchable layer forming a monolithic structure with the thickness of said etchable layer corresponding to the predetermined depth of data pits to be molded in an optical storage disk, applying a photoresist layer on said layer of etchable material, exposing said photoresist layer to generate a data pattern in the photoresist layer, developing and removing portions of the exposed photoresist to produce a data pattern mask, etching said layer of etchable material, through said mask, down to the semiconductor substrate effectively forming pits in the monolithic structure, said pits having a depth corresponding to the predetermined depth of data pits to be molded in an optical disk, and removing the remaining photoresist to form a master mold for insertion in the optical disk molding jig.

2. A process according to claim 1 wherein said single crystalline semiconductor substrate is selected from a group including silicon and germanium.

3. A process according to claim 1 wherein said semiconductor substrate is silicon and said layer of etchable material is silicon oxide and is thermally grown on said substrate.

4. A process according to claim 1 wherein the photoresist layer in said applying step is a positive photoresist.

5. A process according to claim 1 wherein said applying step is accomplished by spin coating.

6. A process according to claim 1 wherein the photoresist layer is exposed to a laser beam modulated according to the data to be stored.

7. A process according to claim 4 wherein the exposed photoresist is developed using a method allowing removal to occur at the portions of the photoresist layer not exposed to the laser beam.

8. A process according to claim 5 wherein said thermally created layer is etched by reactive ion etching.

9. A process according to claim 5 wherein said thermally created layer is etched by sputter etching.

10. A process according to claim 5 wherein said thermally created layer is etched by aqueous chemical etching.

11. A process according to claim 1 wherein said semiconductor substrate is silicon and said layer of etchable material is selected from a group including silicon oxide and silicon nitride and is chemical-vapor deposited on said substrate.

* * * * *